United States Patent [19]

Goebel et al.

[11] Patent Number: 4,758,839
[45] Date of Patent: Jul. 19, 1988

[54] TERRAIN PROFILE RADAR SYSTEM

[75] Inventors: Robert H. Goebel; Dale A. Fogle, both of St. Louis County, Mo.

[73] Assignee: McDonnell Douglas Corporation, Long Beach, Calif.

[21] Appl. No.: 76,480

[22] Filed: Jul. 22, 1987

[51] Int. Cl.[4] ............................................. G01S 13/08
[52] U.S. Cl. ................................. 342/132; 342/120; 342/132; 342/145
[58] Field of Search ............... 342/132, 120, 122, 134, 342/145, 194, 195, 202

[56] References Cited

U.S. PATENT DOCUMENTS

| | | | |
|---|---|---|---|
| 4,357,610 | 11/1982 | Kingston et al. | 342/21 |
| 4,359,735 | 11/1982 | Lewis et al. | 342/194 |
| 4,468,638 | 8/1984 | Kyriakos | 331/178 |
| 4,618,863 | 10/1986 | Collins | 342/194 |
| 4,706,092 | 11/1987 | Magne | 342/109 |

Primary Examiner—Thomas H. Tarcza
Assistant Examiner—John B. Sotomayor
Attorney, Agent, or Firm—Gregory A. Cone; George W. Finch; John P. Scholl

[57] ABSTRACT

Stable measurement of terrain-height variations is provided by this radar system which employs a very low power spread spectrum transmitted signal which, after reception, is processed digitally for extremely stable and predictable performance. The system also includes an automatic power control circuit to maintain the transmitted power at the minimum required level.

6 Claims, 1 Drawing Sheet

TERRAIN PROFILE RADAR SYSTEM

BACKGROUND OF THE INVENTION

This invention relates to radar altimeters. More particularly, this invention relates to radar altimeters which measure height variations between adjacent parcels of terrain rather than from a reference datum plane. Still more particularly, this radar altimeter system relates to radars which employ digital methods for signal correlation, pulse summing, and peak pulse recognition.

A variety of phase modulated radars exist in the prior art, one of which is issued to Sol Rauch for a "Psuedo-Randomly Phased Modulated Radar Altimeter," U.S. Pat. No. 3,774,206, issued on Nov. 20, 1973. This particular reference is instructive for its teaching of the basics of the mechanics of phase modulation of radar signals and the benefits therefrom in addition to its general discussion of radar systems. However, this particular reference describes technology that is now at least 16 years old and does not incorporate the very significant advantages provided by the present system of predominantly digital operation, highly stable operation, and spread spectrum low power transmission and reception of signals.

SUMMARY OF THE INVENTION

This radar system can be conveniently subdivided into a transmitter section, a receiver section and a processor section. In the transmitter section, the high frequency carrier is phase modulated by a unique code and then is amplitude modulated by a pulse signal which has a relatively short pulse width and a relatively longer period. The phase modulation code is also used in the receiver section to correlate and recognize the returning signals in the received waveforms. Also, the amplitude modulation pulse signal is utilized to generate the time gate for the processing of the received signals. In the receiver section the returning energy is first received by an antenna, is then filtered with a bandpass filter, and is multiplied by the sine and cosine of a waveform at a frequency similar to that of a transmitted waveform, thereby creating two channels of received energy signals in the receiver. These signals are then limited and passed through analog-to-digital converters into the digital processing section. In this section the sine and cosine digitized signals are correlated against the phase modulation code, squared and summed for a plurality of pulses and then passed through detection logic means which searches for the presence of signals above a false alarm threshold and also determines the time location of the gate which admits the received signals into the processor section. The location of this gate in turn gives an indication of the initial reception of a true received pulse. This information is combined with the knowledge of the time at which the initial pulse was transmitted to enable a calculator section to determine the altitude of the radar system above the ground surface reflecting the radar energy back to the system.

This radar system is interchangeable with present radar altimeters in every known application and at any altitude. Additionally, it may be used to support terrain and obstacle avoidance for low flying vehicles because of its accuracy and stability. It may also be used to provide terrain height measurements in use in terrain correlation and resulting position location. In fact, this radar was initially conceived for this purpose and meets requirements not known to be available from any other radar altimeter system.

The analog-to-digital conversion just after the radio frequency section provides a stability of operation not available in prior art radar altimeter systems. The threshold for detection is set based on the peak height of the average pulse, providing extremely stable and predictable performance. Performance stability is an inherent requirement for correlating terrain heights at high altitudes since an a priori prediction of performance is required in generating the reference map used in terrain correlation techniques. Additionally, the system provides automatic power control from the receiver to the transmitter via digital techniques. The system operates on a very low signal-to-noise ratio (as low as $-16$ db), thereby allowing binary quantization and the resulting simplified hardware. The transmitted signal has been described as spread spectrum. This means that it has been spread out over a wide bandwidth in order to reduce the impact of unwanted inputs at the receiver. The immunity to unwanted inputs can be as much as 25 db.

BRIEF DESCRIPTION OF THE DRAWING

The FIGURE is schematic block diagram of the various elements of the radar system.

DETAILED DESCRIPTION OF THE INVENTION

Figure 1:
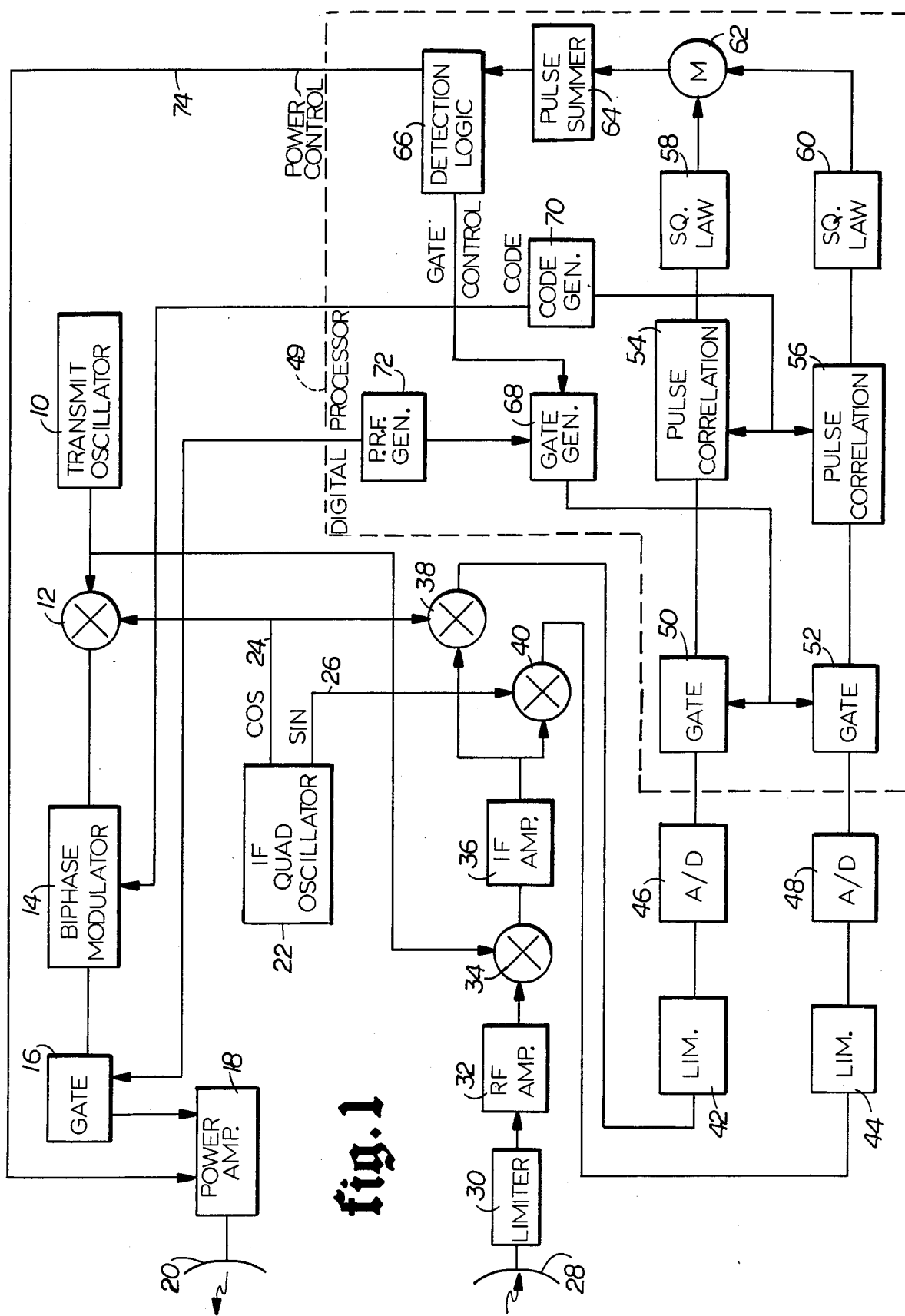

Turning to the drawing FIGURE, the transmitted signal consists of a high frequency carrier which is first phase modulated by a coded signal and then amplitude modulated by a pulse signal. The high frequency carrier originates at the transmitting oscillator 10 and generates a frequency for this embodiment at X band. The phase modulation consists of multiplying the oscillator output by a binary sequence with amplitude of $\pm 1$ and a constant period of 100 nanoseconds (ns). The amplitude of the binary sequence changes randomly between the $+1$ and $-1$ value from one period to the next and is generated by the code generator 70 in the digital processor section 49 of the radar system. This multiplication by a $+1$ or $-1$ is equivalent of phase modulating with a 0° or 180° phase shift respectively. The resulting signal is then amplitude modulated with a periodic pulsed signal which has a ten microsecond pulse width and a 0.2 millisecond period in this embodiment. This signal is also generated in the digital processor section 49 by the pulse repetition frequency generator 72. The output of this pulse repetition frequency generator 72 is also used to generate the gating signal for the received wave form. The new phase and amplitude modulated transmitted signal is conducted to the power amplifier 18 and from there to the transmitting antenna 20. The signal strength broadcast from the power amplifier 18 is controlled in turn by an automatic power control loop whose intelligence is contained within the digital processor section 49 to be explained later. The transmitted wave form consists of a periodic train of 10 microsecond pulses, each of which is divided into 100 intervals called chips. Each chip has a time duration of 100 nanoseconds which is the same as a single period of the phase modulation.

The received signal is captured by the receiving antenna 28 and is then limited by a limiter 30 to prevent harming the rf amplifier 32 which follows. The signal is then heterodyned as shown with the mixer 34 to the IF frequency where it is further amplified by the IF amplifier 36 and then passed into the quadrature multipliers 38 and 40 as shown. These quadrature multipliers 38 and 40 receive a cosine and sine signal respectively from the IF quadrature oscillator 22. The two quadrature components are then limited by the limiters 42 and 44 as shown and passed through the analog to digital converters 46 and 48. From here the quadrature components pass into the digital processor section 49.

The digital processor section 49 of the radar system is responsible for many of the advantages of the present radar system compared to the prior art. The relatively early conversion of the data to a digital format allows for high speed, accurate processing of the data. The digital processor section also contains resident decision making capability which will control the transmitted power of the radar system to the lowest practical level to minimize the power expenditure of the radar system and also to minimize the detectibility of the transmitted pulses. The now digitized quadrature components are passed through the gates 50 and 52. The gate width in time is made long enough to contain the leading edge and peak of the pulse after the correlation processes which follow in the digital processing section. This time interval between the leading edge and the peak is made to be variable with a nominal value of about 600 nanoseconds. The width of the actual gate itself in this embodiment is made to be 10.55 microseconds to allow for the pulse correlation processes performed immediately downstream in the processor section. For this particular example, the 10.55 microsecond figure represents the basic pulse width of 10 microseconds for the transmitted wave form plus an additional eleven 50 nanosecond intervals to allow for 12 different correlations to be conducted at the 50 nanosecond interval. In the pulse correlation blocks 54 and 56 the quadrature components are sampled every 50 nanoseconds to give two samples per 100 nanosecond chip. This allows for better resolution of the leading edge of the returned pulse. The digital samples consist of only one bit since the quadrature components were limited before being sampled. Since the signal to noise ratio at the receiver input is low, the limiting process results in only a 2 db loss in output signal to noise ratio.

The pulse correlation process is performed by a microprocessor in the digital processor section. The actual calculation consists of correlating the random transmitted code with the return signal. Performing this correlation requires only additions and subtractions, since the random code is either plus or minus one. Two hundred summations are required to generate one sample of the compressed pulse, since there are 100 chips per pulse and two samples per chip. A total of 12 samples, separated by 50 nanoseconds per sample, is generated for each quadrature component of each returned pulse for this example. As can be seen in the drawing, the random transmitted code originates at the code generator 70 which provides its output to both the bi-phase modulator 14 in the transmitter section and and pulse correlator blocks 54 and 56 in the digital processor section. In other words, as a single pulse comes through each of the quadrature pulse correlators, it will result in the production of 12 different correlated samples, each different sample being generated by running the random transmitted code through the received signals at each of the twelve 50 nanosecond intervals. The respective quadrature outputs from these pulse correlator blocks 54 and 56 are then squared in the blocks 58 and 60 and summed together in the summation block 62. The now combined 12 samples for each received pulse are then input to the pulse summer 64. The pulse summer will collect the correlated output samples which result from a minimum of 50 received pulses in this example. The exact number of pulses summed together depends upon the application.

These 12 correlated samples (each of which is actually a summation of at least 50 pulse-correlation operations at each of the 12 different time intervals each 50 nanoseconds apart) are then operated upon by the detection logic section 66. The amplitude and location of the peak of these samples is determined first. This "peak" is actually the particular one out of the 12 samples of the output from the pulse summer which has the highest value after the summation. The amplitude of the peak is used to determine if a valid signal return is present. This is accomplished by comparing the received signal with the preset threshold. This threshold is set as a function of the thermal noise power and the desired false alarm probability. If the false alarm threshold is not exceeded, the system is placed into a re-acquisition mode. If the threshold is exceeded, the leading edge detection threshold is set equal to 50% of the peak value. The samples preceding the peak are examined to determine the location of the threshold crossing. Interpolation is used to obtain a more accurate determination of the crossing time. A straight line interpolation is used between samples on either side of the threshold level to make the determination. The time between the leading edge of the transmitted pulse and the threshold crossing is determined from knowledge of the gate start time with respect to the leading edge of the transmitted pulse and the thresholding location within the gate. The value of the peak signal level within the gate is also compared with a second threshold to adjust the power level of the transmitted signal. This second threshold is set so that the desired output signal to noise ratio is obtained. The output signal must be maintained at this value so that the receiver will remain linear. This power level control command information is transmitted from the detection logic block 66 in the digital processor section 49 over control line 74 which connects to the power amplifier 18 in the transmitter section.

The location of the signal peak in time is used to readjust the gate starting location so that the next pulse peak is set at the desired location in the gate if the next altitude measurement remains the same. As was mentioned previously, the actual location of the gate in time is controlled by the gate generator 68 which is in turn controlled by the gate control logic contained in the detection logic section 66. Initial acquisition is accomplished by sweeping the tracking gate from an initial preset altitude over the desired altitude range. This sweep consists of shifting the gate in intervals of its width on either side of the preset value in an oscillating manner. At each gate location, the prescribed number of pulses is summed and the peak of the pulses compared with the detection threshold. If the threshold is exceeded, the tracking mode is entered and operation proceeds as described above. If during tracking the detection threshold is not exceeded, the system enters the re-acquisition mode. This mode is identical to the initial acquisition mode except that the sweep starts at the present gate location and then shifts the gate in intervals on the other side of the gate location of the immediately previous pulse as was done above for the initial acquisition process.

The specific hardware configurations which may be combined together to form the system of this invention are considered to be within the knowledge of one having ordinary skill in the art. As such, specific part designations have been omitted herefrom in the interest of brevity and clarity. Indeed, many such combinations are possible, and the scope of our invention should be measured by the following claims.

We claim:

1. A radar altimeter system having a transmitter section, a receiver section and a digital processor section wherein:

the transmitter section comprises:
   a transmitting oscillator producing a high frequency carrier;
   a phase modulator capable of sequentially changing the phase of the carrier signal between 0° and 180° according to a code at a first constant frequency during a period defined by an amplitude modulator and randomly changing to other sequences of phase changes during the following periods;
   an amplitude modulator producing a periodic pulsed signal having a period and, within it, a pulse having a pulse width (a chip);
   a power amplifier; and
   a transmitting antenna;

the receiver section comprises:
   a receiving antenna;
   a radio frequency amplifier;
   means to heterodyne the received signal to an intermedate frequency;
   an intermediate frequency amplifier;
   quadrature multipliers which multiply the signal by the cosine and sine of the intermediate frequency carrier, thereby creating two quadrature components; and
   analog to digital conversion means acting upon the two quadrature components which sample the signal at a rate which is at least twice the frequency of the code to produce at least two samples per chip;

and the digital processor section comprises:
   input gate means for the two quadrature components, having a temporal width which is controllably adapted to allow only the passage of a received pulse as well as sufficient additional time to allow a plurality of correlation operations to be conducted at closely spaced time intervals;
   correlation means for each of the two quadrature components to add the received quadrature component to the transmitted code, then to time shift the transmitted code the closely spaced time interval and re-add the code to the received quadrature component, then repeatedly to time shift and re-add the transmitted code until the plurality of correlation operations is completed and repeating the correlation operations for a plurality of pulses;
   squaring means to square the outputs of the correlation means;
   summation means which add together the squared outputs of the correlation means for the two quadrature components for transmission to a pulse summing means;
   pulse summing means which sum the squared outputs of the correlation means such that the individual pluralities of pulses are summed for each closely spaced time interval for which the correlation operation is done;
   detection logic means which receives the output of the pulse summing means, finds the closely spaced time interval having the highest sum (peak value), said sum exceeding a preset false alarm threshold level and provides to the processor section the signal level of the highest sum;
   gate control means which shift the temporal position of the input gate means in response to command signals from received signal acquisition or re-acquisition means; and
   altitude calculation means which provide the altitude of the system above a surface based upon the time interval between the transmission of the pulse and the time of reception of the peak value of the received pulse.

2. The system of claim 1 further including transmitted power level control means which comprise:
   means to compare the signal level of the highest summed time interval from the immediately previous transmit/receive/process cycle with a preset reference threshold indicative of a desired signal-to-noise ratio; and
   means to adjust the transmitter signal strength in the present transmit/receive/process cycle to optimize the signal-to-noise ratio based upon the comparison between the signal level of the highest summed time interval of the immediately previous transmitted/receive/process cycle and the preset reference threshold.

3. The system of claim 1 further including initial received signal acquisition means in the detection logic means comprising: means to provide a command signal to the gate control means which will initially cause the temporal position of the input gate to be at a time which corresponds to a preset altitude, then alternately shifting the input gate forward and backward in time in succeeding transmit/receive/process cycles until the input gate position produces a signal level of the highest summed time interval which exceeds the false alarm threshold level, as necessary.

4. The system of claim 1 further including leading edge detection means which are enabled once the false alarm threshold is exceeded which comprise:
   means to establish a leading edge detection threshold set equal to about 50% of the peak signal level of the highest summed time interval,
   means to interpolate from the temporal position of the leading edge detection threshold to an estimated initial received pulse arrival time, and
   means to transmit the estimated initial received pulse arrival time to the altitude calculation means.

5. The system of claim 1 further including received signal re-acquisition means comprising:
   means to initially position the input gate such that the highest sum time interval from the previous transmit/receive/process cycle will be centered therein; and
   means to compare the highest summed time interval signal within the present cycle with the false alarm threshold level, and, if the false alarm threshold level is not exceeded, to provide a signal to the gate control means to cause the temporal position of the gate to alternately shift forward and backward in time until the input gate position produces a signal level of the highest sum time interval which exceeds the false alarm threshold level, as necessary.

6. The system of claim 5 further including leading edge detection means which are enabled once the false alarm threshold is exceeded which comprise:

means to establish a leading edge detection threshold set equal to about 50% of the peak signal level of the highest summed time interval, means to interpolate from the temporal position of the leading edge detection threshold to an estimated initial received pulse arrival time, and means to transmit the estimated initial received pulse arrival time to the altitude calculation means.

* * * * *